US008607697B2

(12) United States Patent
Lape et al.

(10) Patent No.: US 8,607,697 B2
(45) Date of Patent: Dec. 17, 2013

(54) METHOD AND APPARATUS FOR COMPRESSION OF LAMINATION STACK FOR A DYNAMOELECTRIC MACHINE

(75) Inventors: Brock Matthew Lape, Clifton Park, NY (US); Nihan Basaran, Istanbul (TR); Gary Robert Pink, Toccoa, GA (US); Steven Charles Walko, Clifton Park, NY (US); Stuart Alan Oliver, Malvern, AR (US); Lawrence Michael Braun, Clarence Center, NY (US)

(73) Assignee: General Electric Company, Schenectady, NY (US)

( * ) Notice: Subject to any disclaimer, the term of this patent is extended or adjusted under 35 U.S.C. 154(b) by 392 days.

(21) Appl. No.: 12/945,060

(22) Filed: Nov. 12, 2010

(65) Prior Publication Data

US 2012/0118177 A1    May 17, 2012

(51) Int. Cl.
*H02K 15/02* (2006.01)
*B30B 13/00* (2006.01)

(52) U.S. Cl.
USPC .............................. 100/35; 100/265; 100/295

(58) Field of Classification Search
USPC ........... 100/35, 195, 193, 194, 199, 204, 219, 100/237, 257, 269.01, 269.04, 265, 295; 156/228, 288
See application file for complete search history.

(56) References Cited

U.S. PATENT DOCUMENTS

| 1,025,377 | A | * | 5/1912 | Craig | 100/237 |
| 2,492,878 | A | * | 12/1949 | Miollis | 426/414 |
| 2,526,987 | A | * | 10/1950 | Wilson | 100/219 |
| 3,922,575 | A | * | 11/1975 | Sauer | 310/214 |
| 3,940,648 | A | | 2/1976 | Wielt et al. | |
| 4,007,867 | A | * | 2/1977 | Wielt et al. | 228/179.1 |
| 4,479,426 | A | | 10/1984 | Olenfalk | |
| 4,831,301 | A | | 5/1989 | Neumann | |
| 4,854,994 | A | | 8/1989 | Breiter et al. | |
| 5,339,514 | A | * | 8/1994 | Whitesel | 29/596 |
| 5,875,540 | A | * | 3/1999 | Sargeant et al. | 29/596 |
| 6,018,207 | A | | 1/2000 | Saban et al. | |
| 6,448,686 | B1 | | 9/2002 | Dawson et al. | |
| 6,507,990 | B1 | * | 1/2003 | Moreno et al. | 29/596 |
| 6,865,797 | B2 | | 3/2005 | Walko et al. | |
| 7,057,324 | B2 | | 6/2006 | Breznak et al. | |
| 7,966,928 | B2 | * | 6/2011 | Hill | 99/349 |
| 8,276,509 | B2 | * | 10/2012 | Lape et al. | 100/269.01 |
| 2012/0118178 | A1 | | 5/2012 | Lape et al. | |

* cited by examiner

*Primary Examiner* — Dana Ross
*Assistant Examiner* — Chwen-Wei Su
(74) *Attorney, Agent, or Firm* — James W. Pemrick; Ernest G. Cusick; Frank A. Landgraff

(57) ABSTRACT

A method and apparatus is provided for compressing the lamination stack for a dynamoelectric machine. The apparatus includes a plurality of weight distribution plates and a plurality of pressing plates. The plurality of weight distribution plates are placed on one end of the lamination stack of the dynamoelectric machine. The plurality of pressing plates are placed on the plurality of weight distribution plates. A compressive force is applied to the lamination stack via the plurality of weight distribution plates and the plurality of pressing plates.

10 Claims, 5 Drawing Sheets

METHOD AND APPARATUS FOR COMPRESSION OF LAMINATION STACK FOR A DYNAMOELECTRIC MACHINE

BACKGROUND OF THE INVENTION

The present invention described herein relates generally to an apparatus for dynamoelectric machines. More specifically, present invention relates to an apparatus for compressing the lamination stack in the core of a dynamoelectric machine.

Stator core laminations, i.e., punchings, are generally arranged in a plurality of annular arrays thereof forming sets or packets of adjacent stator core laminations. The sets of annular arrays of laminations are axially spaced one from the other by space blocks and installed in a generator stator frame. The space blocks define ventilation passages for directing a cooling flow radially through the stator. Typically, the assembly of the laminations is performed manually by disposing the laminations on dovetail-shaped keybars which have male projections complementary to the female projections along the outer diameter of the individual laminations. During assembly, the lamination stack can develop undesirable waves caused by burrs created during the punching process. In addition, trapped air may also cause undesirable waves in the lamination stack.

BRIEF DESCRIPTION OF THE INVENTION

In an aspect of the present invention, an apparatus is provided for compressing the lamination stack for a dynamoelectric machine. The apparatus includes a plurality of weight distribution plates and a plurality of pressing plates. The plurality of weight distribution plates are placed on one end of the lamination stack of the dynamoelectric machine. The plurality of pressing plates are placed on the plurality of weight distribution plates. A compressive force is applied to the lamination stack via the plurality of weight distribution plates and the plurality of pressing plates.

In another aspect of the present invention, a method is provided for compressing a lamination stack for a dynamoelectric machine. The method includes the steps of providing the lamination stack, providing a plurality of weight distribution plates, providing a plurality of pressing plates, placing the plurality of weight distribution plates one at least one end of the lamination stack, placing the plurality of pressing plates on the plurality of weight distribution plates, and applying a compressive force to the lamination stack via the plurality of weight distribution plates and the plurality of pressing plates.

DETAILED DESCRIPTION OF THE INVENTION

A dynamoelectric machine is defined as any machine that converts mechanical energy to electrical energy or converts electrical energy into mechanical energy. A motor or generator are two examples of dynamoelectric machines.

Figure 1:
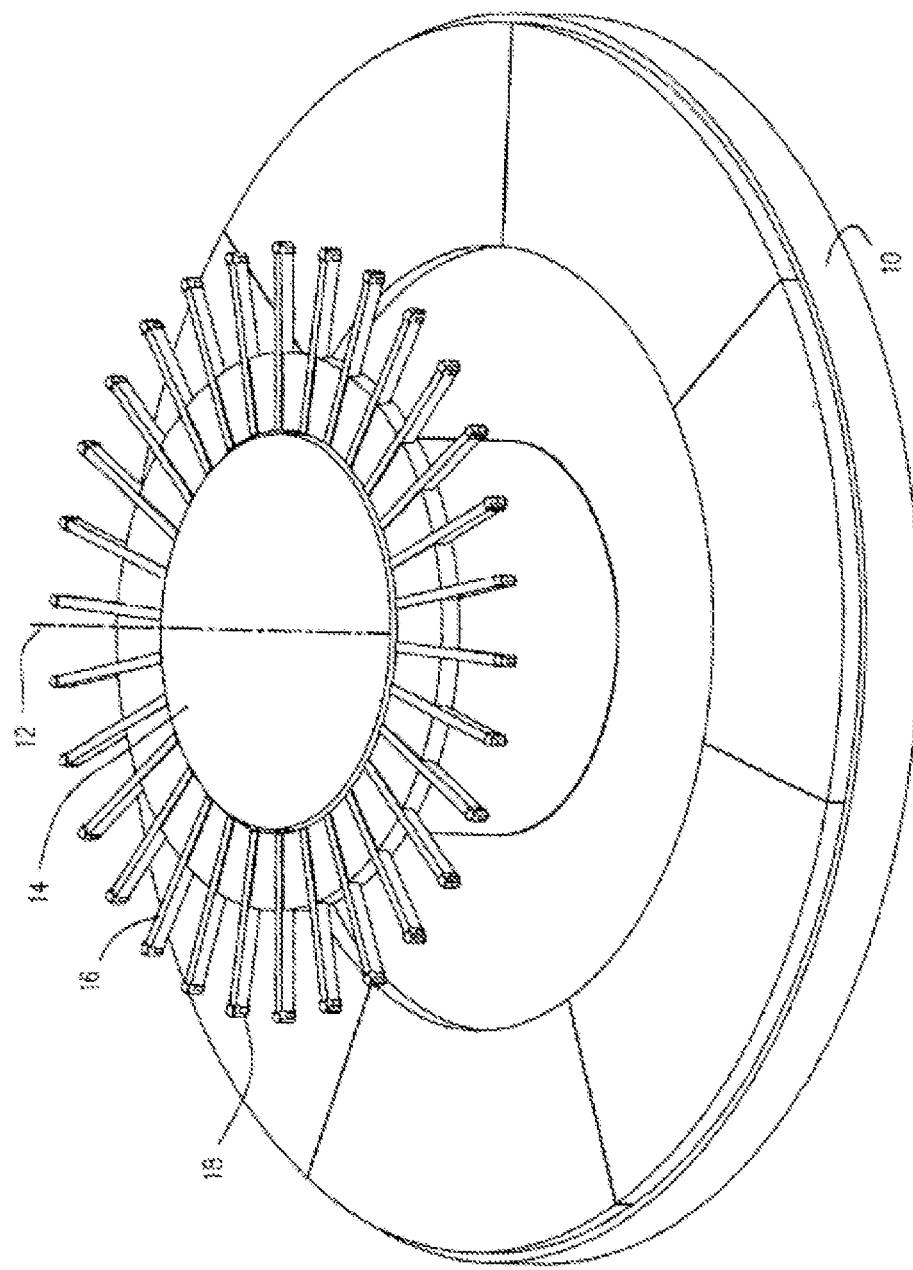
FIG. 1 is a schematic perspective illustration of a table, mandrel and locating fingers forming part of an apparatus for locating and stacking punchings.
Figure 2:
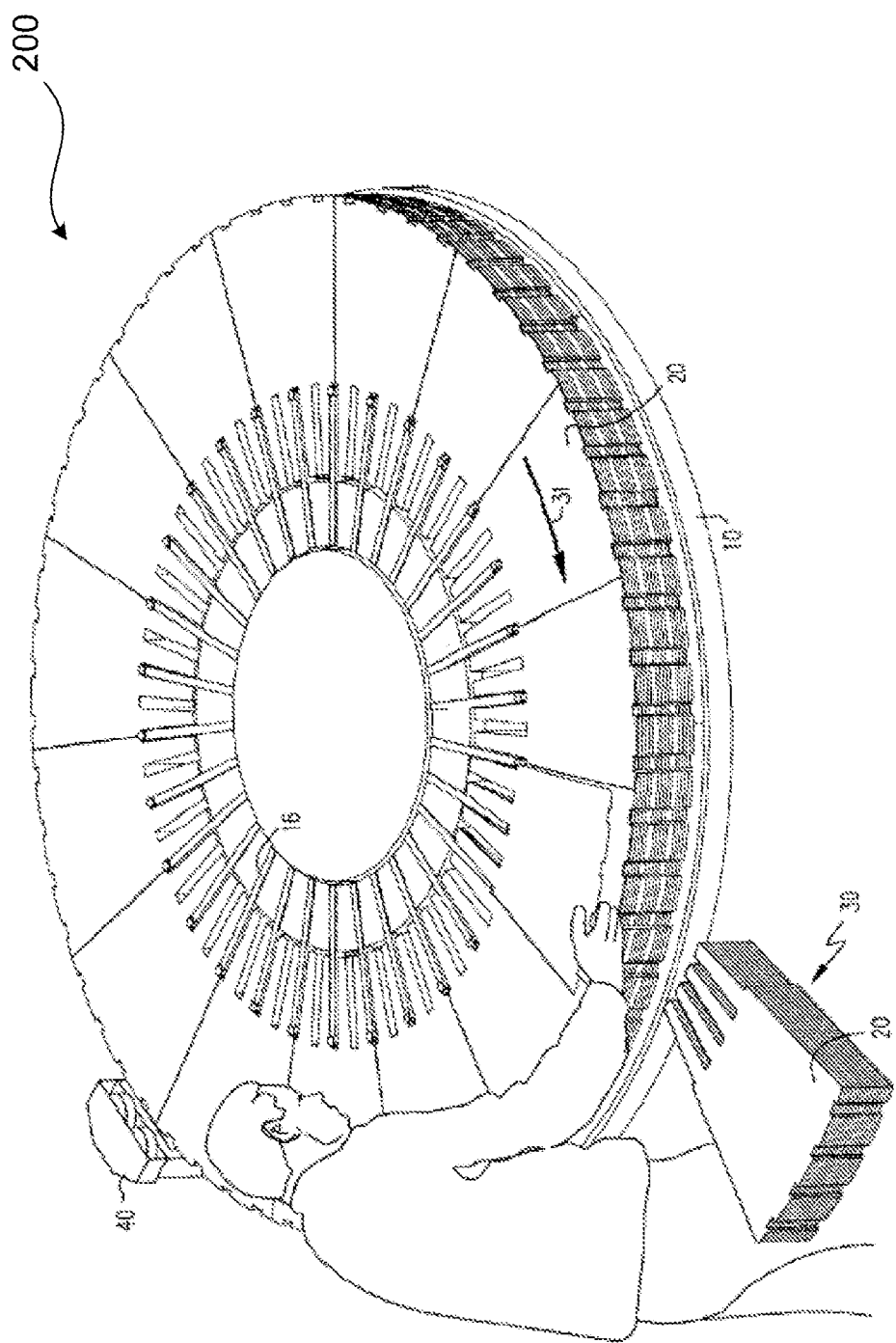
FIG. 2 is a schematic representation illustrating placement of individual punchings on the table to form stacked, annular arrays thereof.

Referring now to the drawings, and particularly to FIGS. 1 and 2, there is illustrated a support, e.g., a table 10, mounted for rotation about an axis 12 by a suitable drive, for example, an electric, hydraulic or pneumatic motor, not shown. The table 10 is preferably annular in form and surrounds a mandrel 14 rotatable about axis 12 with table 10. Mandrel 14 is also adjustable in elevation relative to table 10. Like the table, the mandrel may be elevated by any suitable, drive, preferably an electric motor. As illustrated, the mandrel mounts a plurality of radially outwardly extending fingers 16 which are rotatable with the mandrel 14 and adjustable in height as the mandrel's height is adjusted. The tips of the fingers 16 terminate in guides 18 for guiding and locating the punchings about the table in annular arrays thereof as described below.

Figure 3:
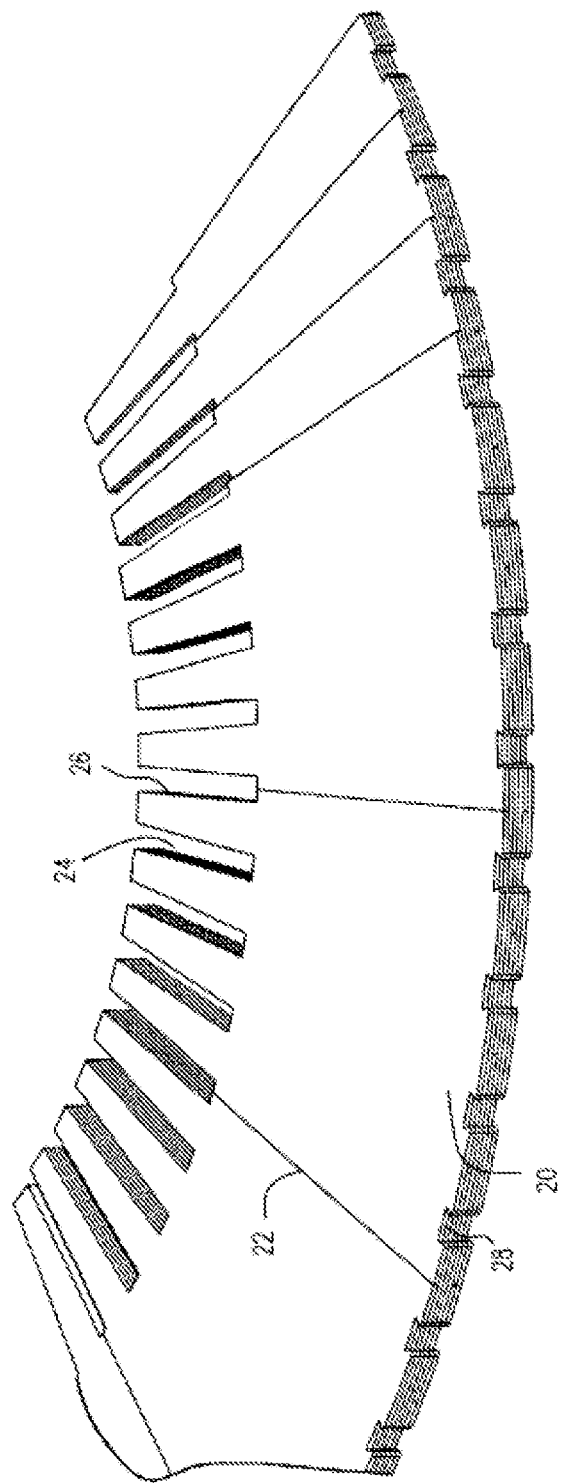
FIG. 3 is an enlarged perspective illustration of a plurality of punchings arranged in annular arrays thereof.

Referring to FIG. 3, a plurality of punchings 20 are illustrated. In the illustrated form of punchings, each punching has a generally radially extending edge 22, a plurality of full radially extending slots 24 spaced circumferentially one from the other along an inner, circumferentially extending margin and a radially extending half-slot 26 along opposite sides 22 of the punching adjacent the inner margin. Each punching may also include an optional dovetail shape 28 at circumferentially spaced locations along the outer margin thereof. As illustrated in FIG. 3, there are six layers of superposed punchings 20 for illustration purposes, although it will be appreciated that greater or fewer numbers of layers may be provided.

It will be seen in FIG. 3 that the radial juncture along the side edges 22 of adjacent punchings 20 of each layer does not underlie the joints between adjacent punchings of adjacent layers. In this illustrated embodiment and as one example only, the punchings are thus staggered in a circumferential direction relative to one another and the joints of circumferentially adjacent punchings of every fourth layer lie in vertical alignment one with the other.

It will be appreciated, however, that the half-slots 26 along opposite sides of each punching form full slots with the half-slots 26 of the circumferentially adjoining punchings. The slots 24 and 26 open radially inwardly for receiving guides 18 as noted below. In one example, there are fifteen punchings in each annular layer, with the side edges 22 of the punchings lying in registration and in a common plane with one another. The punchings are stacked one on top of the other in a staggered manner to form a set of a plurality of annular arrays of punchings. The sets, in turn, may be axially spaced from one another on the table by space blocks, not shown, disposed between the sets to form ventilation channels in the finished dynamoelectric machine stator frame. The fingers 16 terminate in guides 18. Each guide 18 includes a semispherical projection on the top of the associated distal end of the finger 16. The distal end of the finger 16 is received within a slot 24 of a punching 20.

Multiple sets of punchings are disposed along the table prior to lifting the sets from the table for installation into the dynamoelectric machine frame as described below. As one specific example only, fifteen punchings form an annular array thereof, the punchings being approximately 0.014 inches thick. A vertical height of approximately two inches for each set of punchings is preferred. This requires approximately 140-150 punchings, one over the other, to form a two-inch thick set of punchings in the axial direction. However, any number of punchings of any suitable thickness can be arranged to form a core of any suitable longitudinal length in a dynamoelectric machine (e.g., a motor and/or generator).

Referring back to FIG. 2, there is illustrated a station 30 where the punchings 20 are inserted onto table 10 as the table 10 rotates, as indicated by arrow 31, past the inserting station 30. In this aspect of the present invention, an individual locates the punching on top of the table or on top of a previously arranged annular array of punchings. As the individual lays the discrete punchings 20 on the table or on 10 top of a previously placed array, the punchings are disposed so that one or more fingers 16 is received within a full slot 24 or a half-slot 26 of the punching. The semi-spherical surfaces 18 assist to guide each punching about the fingers 16 and, hence, align the punching in a selected circumferential and radial position about the table relative to other punchings. As the table rotates, additional punchings are laid on the table and underlying arrays, with the side edges 22 adjoining one another. The individual also staggers the layers of punchings by offsetting the first of an additional 20 layer of punchings relative to the underlying array of punchings so that the joints between the freshly laid punchings do not overlie joints of the underlying punchings.

As the table rotates, the laid punchings may be engaged by a roller system 40 which ensures that the bases of the slots, both full 24 and half-slots 26, are engaged by the guides 18 thereby maintaining an accurate uniform alignment of the slots of the punchings and hence the punchings themselves on the table. System 40 maintains rollers against the outer margins of the circumferentially arrayed punchings. As the elevation of the uppermost layers of punchings increases, the mandrel with the attached fingers is also elevated. This is accomplished either continuously or incrementally in response to sensing the height of the uppermost layer of punchings and mechanically raising the mandrel and fingers in response to the sensed signal. The completed stack of punchings 20 form a lamination stack 200 that can form the stator core of a dynamoelectric machine (e.g., a motor or a generator).

Figure 4:
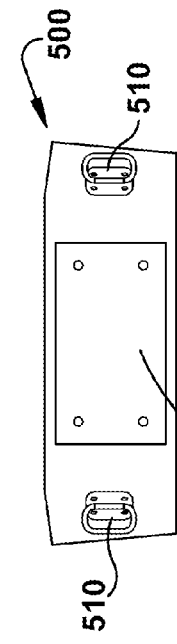
FIG. 4 is a top plan illustration of a weight distribution plate, according to an aspect of the present invention.

FIG. 4 illustrates a top view of a weight distribution plate 400, according to an aspect of the present invention. The weight distribution plate 400 may have a generally rectangular shape or be configured to generally conform to a portion of the shape defined by the lamination stack. The weight distribution plate 400 may have one or more hand holds 410 incorporated therein to facilitate manipulation by an operator or technician. To further facilitate manual manipulation, the weight distribution plate 400 is preferably made of aluminum, aluminum alloy, titanium, titanium alloys, steel, steel alloys or other lightweight material, metal or metal alloy, and have a weight that is comfortably handled by one technician. Alternatively, the weight distribution plate 400 could be made of any suitable material, including but not limited to wood, rubber, ceramic or plastic, or combinations thereof.

Figure 5:
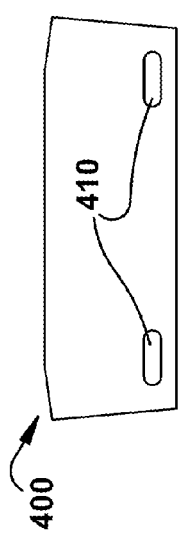
FIG. 5 is a top plan illustration of a pressing plate, according to an aspect of the present invention.

FIG. 5 illustrates a top view of a pressing plate 500, according to an aspect of the present invention. The pressing plate 500 may have a generally rectangular shape or be configured to generally conform to a portion of the shape defined by the lamination stack. The pressing plate 500 may have one or more handles 510 or handholds incorporated therein to facilitate manipulation by an operator or technician. In one example, the handles 510 could be comprised of brackets mounted to the pressing plate 500, where the brackets also include wire loop type handles. In another example, the handles 510 could be replaced with hand holds similar to hand holds 410. The pressing plate 500 may also include a press contact pad 520, and a press makes contact with this portion of the pressing plate 500. To further facilitate manual manipulation, the pressing plate 500 is preferably made of aluminum, aluminum alloy, titanium, titanium alloys, steel, steel alloys or other lightweight material, metal or metal alloy, and have a weight that is comfortably handled by one technician. Alternatively, the pressing plate 500 could be made of any suitable material, including but not limited to wood, rubber, ceramic or plastic, or combinations thereof. Alternatively, the press contact pad 520 could be omitted and a separate set of additional pressing plates could be mounted on top of the pressing plates 500, where the additional pressing plates would facilitate increasing and/or distributing the pressing or compressive force as desired in the specific application.

The weight distribution plates 400 and/or the pressing plates 500 may be used with air filled bags or containers. The air filled bags can be placed between the plates 400, 500 and a force resisting element. The air bags can be filled with compressed air to apply a compressive force on the lamination stack 200.

Figure 6:
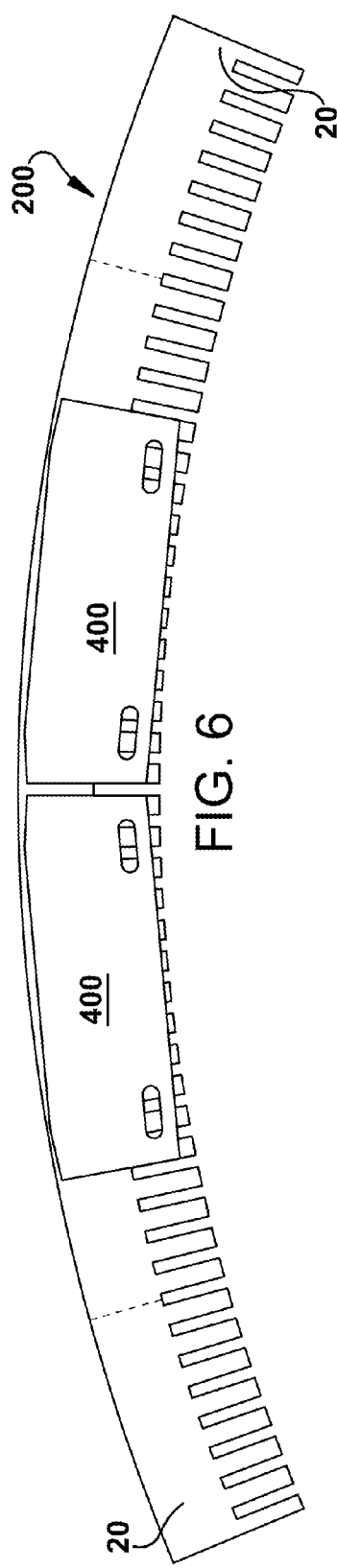
FIG. 6 is a top plan illustration of weight distribution plates arranged on top of a lamination stack, according to an aspect of the present invention.

FIG. 6 illustrates a top plan view of a lamination stack 200 having two weight distribution plates stacked thereon. In operation, during a lamination stack press cycle, the weight distribution plates 400 are placed on top of the lamination stack 200 and arranged over the entire circumference of the lamination stack 200. The lamination stack 200 may be a partially assembled lamination stack or a completed lamination stack. In some applications, it may be desirable to have a "staged" pressing operation where the lamination stack is pressed in stages prior to final completion.

Figure 7:
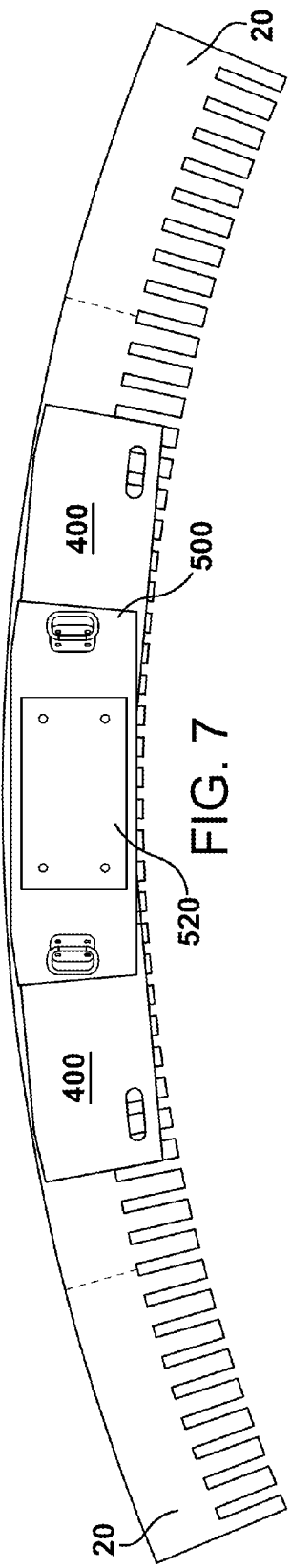
FIG. 7 is a top plan illustration of weight distribution plates and a pressing plate arranged on top of a lamination stack, according to an aspect of the present invention.

FIG. 7 illustrates a top plan view of a lamination stack having two weight distribution plates 400 stacked thereon with a pressing plate 500 placed on top of the two weight distribution plates. Only a few plates are shown for clarity, and it is to be understood that both the weight distribution plates 400 and pressing plates 500 would be disposed around the entire circumference of the lamination stack. The pressing plates are preferably placed to overlie portions of two weight distribution plates 400.

As one non-limiting example only, a pressing operation is now described. The weight distribution plates 400 and pressing plates 500 are set on top of the lamination stack 200. Each plate may cover a span of about 30" to about 36" but plates having any dimension can be used as desired in the specific application. The plates 400 and 500 are arranged to cover staggered joints allowing a per square inch (psi) load to be equally spread. After arrangement of the plates 400, 500 a force is put on the pressing plates 500 equaling a pounds per square inch compression generated thru the pressing plate 500—weight distribution plate 400 assembly into the core stack lamination assembly 200 of about 40 to 45 psi. However, any suitable pressure can be applied as desired in the specific application. The compressive force transferred to the lamination stack 200 compresses the stacked laminations 20 and removes trapped air, waves in the stack and compresses lamination burrs and/or upsets from the punching/laser cutting during the lamination manufacturing process and/or lamination deformities during the stacking process.

Figure 8:
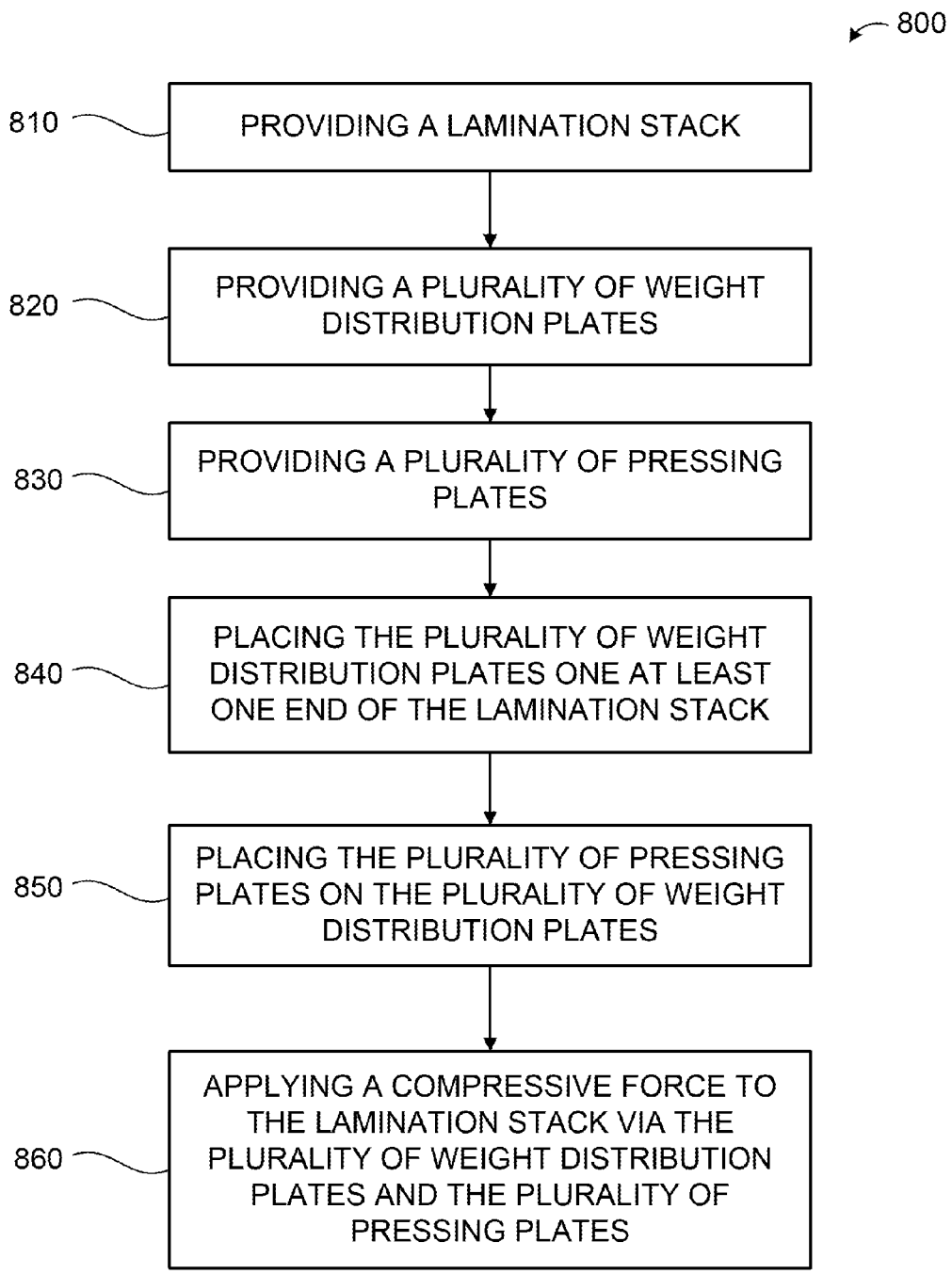
FIG. 8 is a flowchart of a method for compressing a lamination stack, according to an aspect of the present invention.

FIG. 8 is a flow chart of a method 800 for compressing a lamination stack in a dynamoelectric machine. The method 800 includes a step 810 of providing a lamination stack, a step 820 of providing a plurality of weight distribution plates, a step 830 of providing a plurality of pressing plates, a step 840 of placing the plurality of weight distribution plates one at least one end of the lamination stack, a step 850 of placing the plurality of pressing plates on the plurality of weight distribution plates, and a step 860 of applying a compressive force to the lamination stack via the plurality of weight distribution plates and the plurality of pressing plates.

Step 820 can also include providing a plurality of weight distribution plates comprised of aluminum, and/or providing a plurality of handholds in each of the plurality of weight distribution plates. Step 830 can also include providing a plurality of pressing plates comprised of aluminum, providing a press contact pad on each of the plurality of pressing plates and/or providing a plurality of handles in each of the plurality of pressing plates. Step 840 can also include a step of arranging the plurality of weight distribution plates on the end of the lamination stack so that joints between adjacent punchings are covered by at least one of the plurality of weight distribution plates. Step 850 can also include a step of arranging the plurality of pressing plates so that joints between adjacent weight distribution plates are covered by at least one of the plurality of pressing plates. The method herein described can be applied to a dynamoelectric machine that is a motor or generator, and a lamination stack used in a stator core.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An apparatus for compression of a lamination stack for a dynamoelectric machine, the apparatus comprising:
   a plurality of weight distribution plates, each of the plurality of weight distribution plates comprising one or more hand holds incorporated therein to facilitate manipulation by an operator or a technician, the plurality of weight distribution plates comprised of at least one of aluminum, aluminum alloy, titanium and steel;
   a plurality of pressing plates, each of the plurality of pressing plates comprising one or more handles, the plurality of pressing plates comprised of at least one of aluminum, aluminum alloy, titanium and steel;
   wherein, the plurality of weight distribution plates are placed on one end of the lamination stack of the dynamoelectric machine, and the plurality of pressing plates are placed on the plurality of weight distribution plates, and wherein a compressive force is applied to the lamination stack via the plurality of weight distribution plates and the plurality of pressing plates.

2. The apparatus of claim 1, wherein the plurality of weight distribution plates are arranged on the end of the lamination stack so that joints between adjacent punchings are covered by at least one of the plurality of weight distribution plates.

3. The apparatus of claim 1, wherein the plurality of pressing plates are arranged on the plurality of weight distribution plates so that joints between adjacent weight distribution plates are covered by at least one of the plurality of pressing plates.

4. The apparatus of claim 1, wherein each of the plurality of pressing plates comprises a press contact pad.

5. The apparatus of claim 1, wherein the dynamoelectric machine is at least one of a motor and a generator.

6. The apparatus of claim 5, wherein the lamination stack comprises a stator core.

7. A method for compressing a lamination stack for a dynamoelectric machine, the method comprising:
   providing a plurality of weight distribution plates comprised of at least one of aluminum, aluminum alloy, titanium and steel, providing a plurality of handholds, incorporated therein to facilitate manipulation by an operator or a technician, in each of the plurality of weight distribution plates;
   providing a plurality of pressing plates comprised of at least one of aluminum, aluminum alloy, titanium and steel, providing a plurality of handles in each of the plurality of pressing plates;
   placing the plurality of weight distribution plates on at least one end of the lamination stack;
   placing the plurality of pressing plates on the plurality of weight distribution plates;
   applying a compressive force to the lamination stack via the plurality of weight distribution plates and the plurality of pressing plates; and
   wherein the dynamoelectric machine is at least one of a motor and a generator, and the lamination stack comprises a stator core.

8. The method of claim 7, wherein the step of placing the plurality of weight distribution plates further comprises:
   arranging the plurality of weight distribution plates on the end of the lamination stack so that joints between adjacent punchings are covered by at least one of the plurality of weight distribution plates.

9. The method of claim 7, wherein the step of placing the plurality of pressing plates further comprises:
   arranging the plurality of pressing plates so that joints between adjacent weight distribution plates are covered by at least one of the plurality of pressing plates.

10. The method of claim 7, further comprising:
    providing a press contact pad on each of the plurality of pressing plates.

\* \* \* \* \*